United States Patent
Roith et al.

(10) Patent No.: US 12,291,211 B2
(45) Date of Patent: May 6, 2025

(54) METHOD FOR DETECTING THE STANDSTILL OF A VEHICLE

(71) Applicant: Robert Bosch GmbH, Stuttgart (DE)

(72) Inventors: Sebastian Roith, Ludwigsburg (DE); Jens Strobel, Freiberg am Neckar (DE); Manuel Popp, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 17/814,068

(22) Filed: Jul. 21, 2022

(65) Prior Publication Data

US 2023/0023080 A1  Jan. 26, 2023

(30) Foreign Application Priority Data

Jul. 22, 2021  (DE) ..................... 10 2021 207 893.1

(51) Int. Cl.
*B60W 40/10* (2012.01)

(52) U.S. Cl.
CPC ......... *B60W 40/10* (2013.01); *B60W 2520/14* (2013.01); *B60W 2554/4041* (2020.02)

(58) Field of Classification Search
CPC ........... B60W 30/18054; B60W 60/00; B60W 2050/0052; B60W 2050/0086; B60W 2050/0215; B60W 2420/403; B60W 2520/14; B60W 2520/16; B60W 2520/18; B60W 2520/28; B60W 2554/4041; B60W 2556/35; G01C 19/00; G01C 19/005; G01C 21/16; G01C 21/165; G01C 21/1656; G01C 21/188; G01C 25/00; G01C 25/005

See application file for complete search history.

(56) References Cited

U.S. PATENT DOCUMENTS

| | | | |
|---|---|---|---|
| 9,988,059 B2 * | 6/2018 | Satomura | B60W 30/18145 |
| 2004/0030474 A1 * | 2/2004 | Samuel | B60G 17/0185 |
| | | | 701/31.4 |
| 2013/0184954 A1 * | 7/2013 | Treppenhauer | B60T 8/32 |
| | | | 701/70 |
| 2014/0184785 A1 * | 7/2014 | Sperrle | B60T 8/172 |
| | | | 348/113 |
| 2018/0040104 A1 * | 2/2018 | Lukac | G06T 3/4015 |
| 2020/0088543 A1 * | 3/2020 | Hauck | G01C 25/005 |
| 2023/0356725 A1 * | 11/2023 | Youssef | G01C 25/005 |
| 2024/0175716 A1 * | 5/2024 | Ghadieh | G01C 19/00 |

* cited by examiner

*Primary Examiner* — Peter D Nolan
*Assistant Examiner* — Ce Li Li
(74) *Attorney, Agent, or Firm* — Maginot, Moore & Beck LLP

(57) ABSTRACT

A method for detecting a standstill of a vehicle includes detecting the standstill of the vehicle using at least one sensor, and, when the standstill is detected using the at least one sensor, carrying out a test routine for checking the standstill of the vehicle. The test routine uses at least one signal from at least one rate-of-rotation sensor as an input value. The method further includes rejecting the detected standstill of the vehicle when the at least one signal from the at least one rate-of-rotation sensor indicates that there is no standstill of the vehicle.

8 Claims, 1 Drawing Sheet

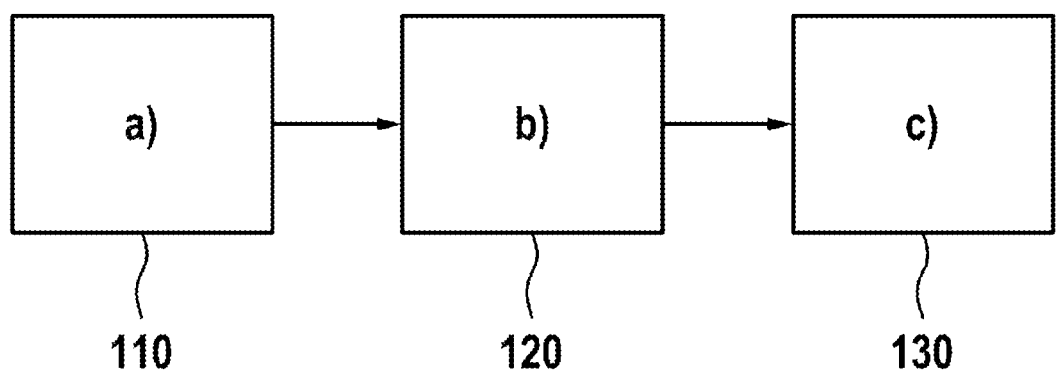

METHOD FOR DETECTING THE STANDSTILL OF A VEHICLE

This application claims priority under 35 U.S.C. § 119 to patent application no. DE 10 2021 207 893.1, filed on Jul. 22, 2021 in Germany, the disclosure of which is incorporated herein by reference in its entirety.

BACKGROUND

The invention relates to a method for detecting the standstill of a vehicle. A computer program, a machine-readable storage medium and a control unit for a vehicle are also specified. The invention may be used, in particular, in GNSS-based and INS-based localization systems for autonomous or partially autonomous driving.

In order to position a vehicle in a highly accurate manner by means of inertial sensors, a high quality of the sensor signals is required. The offset of the inertial sensors may be adjusted during a standstill. The important factor in this case is that a high dynamic response of the signal does not occur during the standstill since this has a negative effect on the adjustment of the offset. In particular, movements induced by external infrastructures, for instance vehicle transport devices, result in considerable errors when calibrating the offset if they are not detected by the detection of a standstill. In particular, vehicle turntables can be detected only with difficulty and cannot be detected in current localization systems.

SUMMARY

On the basis of this, a possible way of detecting the standstill of a vehicle is described. A standstill hypothesis is first of all created with the aid of at least one sensor. The standstill hypothesis is then checked or confirmed with the aid of at least one other sensor. Only the vehicle sensors which are already present are used for this purpose. The described method makes it possible to detect a standstill in a critical scenario, in particular a stationary vehicle on a rotating vehicle turntable, for example.

On the basis of this, a method for detecting the standstill of a vehicle is described, comprising at least the following steps: a) detecting a standstill of the vehicle using at least one sensor, b) if a standstill was detected in step a), carrying out a test routine for checking the standstill of the vehicle, wherein this routine uses at least one signal from at least one rate-of-rotation sensor as input values; and c) rejecting a standstill of the vehicle detected in step a) if it is detected in step b) on the basis of the signal from the at least one rate-of-rotation sensor that there is no standstill.

The standstill of a vehicle here means, in particular, when the vehicle is not moving along an axis or about the axis. The axis is typically the longitudinal axis, the transverse axis and the vertical axis of the vehicle. At a standstill, the vehicle is intended to be stationary with respect to the longitudinal axis, the transverse axis and the vertical axis. The standstill here therefore also means the standstill with respect to the Earth. A stationary vehicle on a movable vehicle transport device is not intended to be considered to be a standstill of the vehicle in this case. The described method can be used, in particular, to detect a stationary vehicle on a rotating vehicle turntable.

In step a), the standstill of the vehicle is detected using at least one sensor.

At least one wheel sensor for determining the speed of a wheel can be used for this purpose, for example. If the determined speed tends towards zero, this indicates that the vehicle is highly likely to be at a standstill.

It is advantageous if the standstill is detected using at least three wheel sensors for determining the speed of at least three wheels. This determination is therefore robust with respect to the defect of one wheel sensor or locked wheels caused by braking (slip).

However, it does not suffice to detect the standstill solely using wheel sensor signals. In particular, a false detection result can be provided when, for example, a stationary vehicle is on a rotating vehicle turntable or, for example, a movable vehicle is moving at a very slow speed (for example below 6-7 km/h).

In step a), the standstill can also be detected using conventional methods, for example from the field of ESP. This is only a standstill hypothesis. Step b) checks whether there is actually a standstill by means of a test routine.

In step b), a test routine for checking the standstill of the vehicle is carried out if a standstill was detected in step a). In this case, this routine uses at least one signal from at least one rate-of-rotation sensor as input values.

In order to carry out a test routine, signals from rate-of-rotation sensors, in particular, are used here as input values. A rate-of-rotation sensor is a type of inertial sensor and is used to capture the rotational movement about an axis. For driving safety and comfort, at least three rate-of-rotation sensors for capturing the rotational movement of the vehicle about the longitudinal axis, the transverse axis and the vertical axis, respectively, are usually arranged in the vehicle. Among these, it is particularly advantageous to consider the rotational movement about the vertical axis. This rotational movement is referred to as yawing and may be captured by a yaw rate sensor. A yaw rate sensor is therefore a rate-of-rotation sensor which captures a rotational movement about the vertical axis of the vehicle. The terms "yaw rate sensor" and "rate-of-rotation sensor" are sometimes used synonymously for one another below. It is also conceivable for the rotational movement about the longitudinal axis and/or about the transverse axis to be able to be captured in an at least partially parallel manner in each case by the corresponding rate-of-rotation sensor.

The captured rotational movement is used as a basis for checking the standstill detected in step a) and is output in the form of an output signal from at least one rate-of-rotation sensor.

In order to obtain the output signal with a high quality for achieving an optimum checking result, it is particularly advantageous to correct the offset of the at least one rate-of-rotation sensor before using the output signal to check the standstill. It is therefore possible to avoid, for example, the situation in which a very slow movement of the vehicle or concomitant rotation of the stationary vehicle on a rotating vehicle turntable is detected as a standstill.

The rotational movement may typically be described by the speed of rotation or by the angle of rotation (rotation angle). In this case, the speed of rotation may be captured, for example, directly by the rate-of-rotation sensor and the angle of rotation may be captured indirectly by integrating the speed of rotation.

If the vehicle is actually at a standstill, the captured speed of rotation or the captured angle of rotation is intended to remain at the minimum. In other words, this means that the output variable of the at least one rate-of-rotation sensor when not at a standstill is intended be significantly greater than at a standstill.

On the basis of the output variable of the at least one rate-of-rotation sensor, the standstill detected in step a) can be checked in step b) by means of a test routine and the created standstill hypothesis can be confirmed on the basis of the checking result.

It is advantageous if the test routine in step b) comprises at least one of the following partial routines: (i) pre-correcting the signal from the rate-of-rotation sensor using at least one offset of the at least one rate-of-rotation sensor by means of a filter, (ii) integrating the signal (after pre-correcting the offset) in a predefinable integration time window, and (iii) checking the standstill detected in step a) on the basis of the integrated (pre-corrected) signal from the at least one rate-of-rotation sensor.

It is particularly advantageous if a pre-corrected rate-of-rotation signal/yaw rate signal from at least one rate-of-rotation sensor/yaw rate sensor is used in step b) as an input value. The pre-corrected rate-of-rotation signal/yaw rate signal is integrated in an integration window as the basis for checking the standstill. It is therefore possible to avoid, in particular, the situation in which a vehicle positioned on a rotating vehicle turntable is detected as a standstill.

If it is detected in step b) on the basis of the signal from the at least one rate-of-rotation sensor that there is no standstill, the standstill of the vehicle detected in step a) is rejected in step c).

With the method described, pre-corrected output signals from rate-of-rotation sensors are used to detect a vehicle transport device, for example a vehicle turntable. This detection is downstream of conventional standstill detection on the basis of wheel sensor signals and is used to confirm the standstill hypothesis.

In order to minimize false alarms, a distinction is made in the method presented here between usable rate-of-rotation measurements and rate-of-rotation measurements which have not yet been sufficiently calibrated. Even in the case of usable rate-of-rotation measurements, the quality of the measurements is taken into account when detecting a vehicle transport device in order to achieve an optimum detection result.

The invention can be used, in particular, in GNSS-based and INS-based localization systems for autonomous or partially autonomous driving.

It is preferred if a variance of the signal from the at least one rate-of-rotation sensor is assessed in step b).

The variance of a signal generally corresponds to the (averaged) power of the AC component of this signal and describes the oscillation intensity of this signal. If the signal oscillates strongly, the variance of the signal shall be accordingly large. The output signal from the at least one rate-of-rotation sensor with a strong oscillation may be an indication of no standstill.

It is advantageous if the standstill detected in step a) can be checked in step b) as a test routine with the aid of the variance of the output signal from the at least one rate-of-rotation sensor.

It is particularly advantageous if the variance of the signal is calculated after pre-correcting the offset of the associated rate-of-rotation sensor. The detected standstill can therefore be checked in step b) without negatively affecting the offset.

It is preferred if it is detected that there is no standstill if the variance of the signal from the rate-of-rotation sensor exceeds a first threshold value.

If the vehicle is actually at a standstill, the variance of the output signal from the at least one rate-of-rotation sensor is intended to be at a minimum value which ideally tends towards zero or, taking into account some conceivable uncertainties, is slightly higher than zero. If the variance (further) exceeds the minimum value, it is indicated that there is no standstill. In this case, this minimum value is referred to as the first threshold value and may be predefined depending on the nature of the sensor in question and the conceivable driving scenarios.

It is preferred if step b) is carried out, in particular, in order to detect when the vehicle is positioned on a turntable and is moved with the turntable.

The turntable is typically a vehicle turntable which makes it easier to turn the vehicle. Such a vehicle turntable is often provided for narrow and restricted parking spaces. A vehicle can be easily rotated into the desired parking or exit position using the vehicle turntable. Conventional methods can detect corruption of a standstill situation as a result of the vehicle being positioned on a rotating vehicle turntable with difficulty or cannot detect it at all.

In step b), the scenario described above is checked, in particular. At least one rate-of-rotation sensor/yaw rate sensor for capturing the rate of rotation/yaw rate about the yaw axis (that is to say vertical axis) of the vehicle is used for this purpose. In order to achieve an optimum checking result, the offset of the rate-of-rotation sensor/yaw rate sensor is corrected by means of a filter, for example, after detecting the standstill in step a) and before using the rate-of-rotation signal/yaw rate signal. The rate-of-rotation signal/yaw rate signal is also integrated in a predefined time window. If the integrated value reaches a threshold value, it is detected that the vehicle is on a vehicle turntable.

It is preferred if the rate-of-rotation sensor signal is captured in step b) in a manner integrated in a predefinable integration window.

A rate-of-rotation sensor generally captures the (instantaneous) speed of rotation about an axis. It is particularly advantageous to integrate the speed of rotation in an integration time window. The speed of rotation integrated in the integration time window corresponds to the angle of rotation (rotation angle) about the axis. The integration time window is predefinable according to application scenarios. For example, in order to detect a stationary vehicle on a rotating vehicle turntable, the integration time window may be defined according to the usually conceivable speeds of rotation of the vehicle turntable, for example 5 seconds, preferably 3 seconds.

It is preferred if the standstill of the vehicle is detected in step b) if the rate-of-rotation sensor signal is below a second predefinable threshold value.

The second threshold value may be predefined, for example, according to a conceivable driving scenario. A conventional driving scenario is, as described above, when a stationary vehicle is on a rotating vehicle turntable for turning. In this driving scenario, the vehicle may rotate through 360°. The second threshold value may be defined, for example, taking into account the predefined integration time window with respect to a conventional speed of rotation of the vehicle turntable.

During turning using a vehicle turntable, the standstill of the vehicle may be detected, for example, if the captured angle of rotation does not reach 30° within 3 seconds. In contrast, a vehicle turntable—that is to say a stationary vehicle on a rotating vehicle turntable—is detected if the captured angle of rotation reaches 30° within 3 seconds.

It is preferred if the rate-of-rotation sensor is a yaw rate sensor.

Whereas lateral tilt and braking or acceleration pitching are usually harmless, rotation of the body about the vertical axis is usually an indication of a critical driving state. Therefore, the yaw rate sensor, which captures the rotational movement about the vertical axis (this is referred to as the yaw rate), is a core element of any high-quality driving dynamics control system.

The yaw rate sensor likewise has the (initial) offset which was described above and is intended to be corrected at rest. If the vehicle is moving when correcting the offset of the yaw rate sensor on account of incorrect detection of the standstill of the vehicle, the accuracy of the measured values subsequently captured by the yaw rate sensor may be impaired.

The described method can be used, on the one hand, to detect the standstill of the vehicle in an improved manner by means of the yaw rate sensor which is already present and, on the other hand, to in turn correct the offset of the vehicle in an improved manner as a result of the improved detection of the standstill.

The yaw rate sensor can be used, in particular, to detect a stationary vehicle on a rotating vehicle turntable.

It is preferred if the offset of the rate-of-rotation sensor is pre-corrected by means of a filter.

The offset of the rate-of-rotation sensor here means, in particular, an initial offset which is caused by the nature of a rate-of-rotation sensor and is normally also influenced by aging and/or the temperature. The offset is output at rest by the rate-of-rotation sensor in the form of a value. This value is normally also corrected at rest.

Pre-correction here means, in particular, that the offset is corrected after creating the standstill hypothesis but still before confirming the standstill hypothesis. Pre-correction differs from the correction of the offset after confirming the standstill hypothesis. This means that the vehicle could nevertheless be moving during pre-correction of the offset.

Pre-correcting the offset of the rate-of-rotation sensor is advantageous for the rate-of-rotation sensor to be able to provide a rate-of-rotation sensor signal of high quality and without being negatively affected by the offset described above.

Pre-correcting the offset is particularly advantageous for detecting a slight movement, for example a stationary vehicle on a movable vehicle transport device, for instance a vehicle turntable. The offset is determined by means of a suitable estimation and is used to correct the rate-of-rotation sensor signal. During this estimation, a variance of the remaining rate-of-rotation sensor signal (without an offset) is preferably also determined.

In order to take into account the quality of the rate-of-rotation sensor used, a Euclidean distance is not used to analyze the first threshold value. Instead, the difference is weighted with a variance. In this case, it is particularly advantageous to use the Mahalanobis distance instead of the Euclidean distance.

In contrast to the Euclidean distance approach, the Mahalanobis distance takes into account the covariance of two sample sets—that is to say two signals, for instance a target output signal and an actual output signal from the rate-of-rotation sensor—thus making it possible to efficiently calculate the similarity of these two unknown sample sets. In addition to the Euclidean distance, the variance of the two signals to be compared is also taken into account.

It is preferred if, after step c), a method for calibrating inertial sensors of the vehicle is started if it is confirmed on the basis of the signal from the at least one rate-of-rotation sensor that there is a standstill. In other words, this means that the inertial sensors of the vehicle are calibrated only after the standstill hypothesis has been confirmed. It is therefore possible to easily avoid the situation in which a high dynamic response of the signal from an inertial sensor occurs during calibration.

It is preferred if a computer program is used to carry out a method described here. In other words, this relates, in particular, to a computer program (product) comprising instructions which, when the program is executed by a computer, cause the latter to carry out a method described here.

It is also preferred if a machine-readable storage medium, on which the computer program proposed here is stored, is used. The machine-readable storage medium is usually a computer-readable data storage medium.

It is preferred, in particular, if a control unit for a vehicle is configured to carry out a method described here.

The details, features and advantageous configurations discussed in connection with the method can accordingly also arise in the computer program presented here and/or the storage medium and/or the localization device and vice versa. In this respect, reference is made in full to the statements made there for more precise characterization of the features.

BRIEF DESCRIPTION OF THE DRAWING

The solution presented here and its technical environment are explained in more detail below with reference to the FIGURE. It should be pointed out that the invention is not intended to be restricted by the exemplary embodiments shown. In particular, unless explicitly described otherwise, it is also possible to extract partial aspects of the substantive matter explained in the FIGURE and to combine them with other elements and/or knowledge from other FIGURES and/or the present description. Schematically:

The FIGURE shows a sequence of a method presented here for detecting the standstill of a vehicle during a normal operating sequence.

DETAILED DESCRIPTION

The FIGURE schematically shows a sequence of a method presented here for detecting the standstill of a vehicle during a normal operating sequence. The illustrated order of method steps a), b) and c) with the blocks 110, 120, 130 is only exemplary. In block 110, a standstill of the vehicle is detected using at least one sensor. In block 120, a test routine for checking the standstill of the vehicle is carried out if a standstill was detected in step a), wherein this routine uses at least one signal from at least one rate-of-rotation sensor as input values. In block 130, a standstill of the vehicle detected in step a) is rejected if it is detected in step b) on the basis of the signal from the at least one rate-of-rotation sensor that there is no standstill.

In particular, method step b) comprises at least one of the following test routines: (i) pre-correcting the offset of the at least one rate-of-rotation sensor by means of a filter, wherein the rate-of-rotation sensor uses a pre-corrected signal of high quality as input values, (ii) integrating the signal (after pre-correcting the offset) in a predefinable integration time window, and (iii) checking the standstill detected in step a) on the basis of the integrated (pre-corrected) signal from the at least one rate-of-rotation sensor.

In particular, in method step b), a pre-corrected yaw rate signal from at least one yaw rate sensor is used as an input value. The pre-corrected yaw rate signal is integrated in an integration window as the basis for checking the standstill.

The described method makes it possible to avoid, in particular, the situation in which a vehicle positioned on a rotating vehicle turntable is detected as a standstill.

What is claimed is:

1. A method for operating a vehicle, the method comprising:
    detecting standstill of the vehicle using at least one sensor of the vehicle;
    in response to the standstill being detected using the at least one sensor, carrying out a test routine for checking the standstill of the vehicle, wherein the test routine uses at least one signal from at least one rate-of-rotation sensor as an input value, the test routine including (i) pre-correcting an offset of the at least one rate-of-rotation sensor using a filter based on a weighted difference and a weighted variance of an output signal, (ii) forming an integrated signal by integrating at least one signal from at least one rate-of-rotation sensor in a predefined integration window, and (iii) determining the standstill of the vehicle in response to the integrated signal being below a predefined threshold value;
    rejecting the detected standstill of the vehicle when the at least one signal from the at least one rate-of-rotation sensor indicates that there is no standstill of the vehicle; and
    calibrating inertial sensors of the vehicle when it is confirmed based on the at least one signal from the at least one rate-of-rotation sensor that there is a standstill of the vehicle, the inertial sensors including the at least one rate-of-rotation sensor;
    determining a position of the vehicle using the inertial sensors; and
    operating the vehicle based on the position of the vehicle.

2. The method according to claim 1, wherein the test routine includes assessing a variance of the at least one signal from the at least one rate-of-rotation sensor.

3. The method according to claim 2, wherein it is detected that there is no standstill when the variance of the at least one signal from the at least one rate-of-rotation sensor exceeds a threshold value.

4. The method according to claim 1, wherein the test routine is carried out in order to detect when the vehicle is positioned on a turntable and is moved with the turntable.

5. The method according to claim 1, wherein the at least one rate-of-rotation sensor is a yaw rate sensor.

6. The method according to claim 1, wherein a computer program is configured to carry out the method.

7. The method according to claim 6, wherein the computer program is stored on a non-transitory machine-readable storage medium.

8. The method according to claim 1, wherein a control unit for the vehicle is configured to carry out the method.

* * * * *